Nov. 2, 1965     C. I. CLAUSING     3,215,799
MAGNETIC TRIP STRUCTURE FOR HIGH SPEED CIRCUIT BREAKERS
Filed May 2, 1961     2 Sheets-Sheet 1
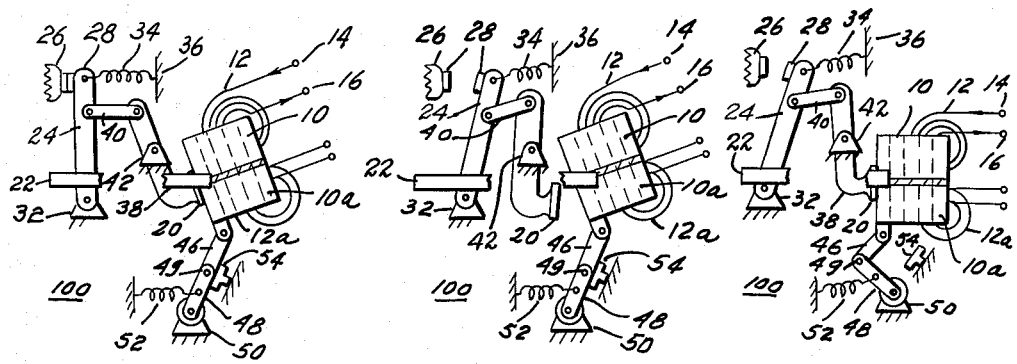
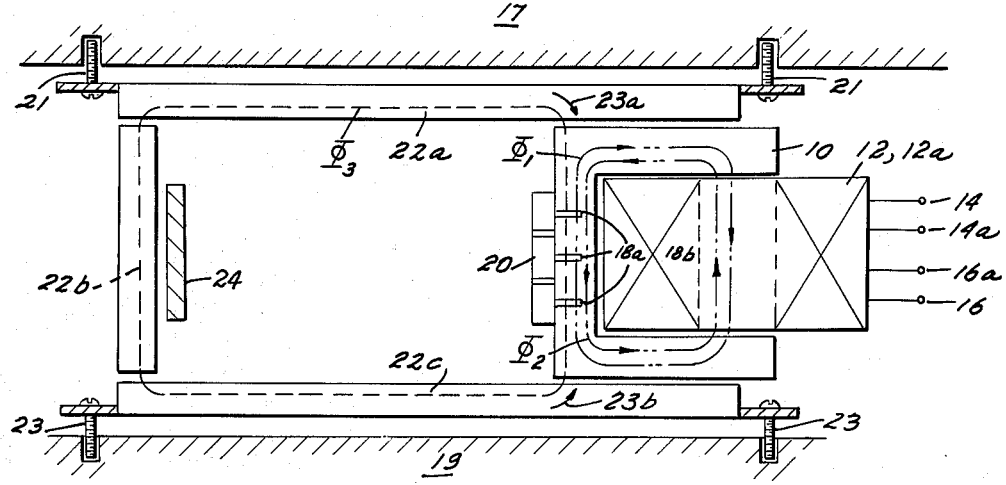
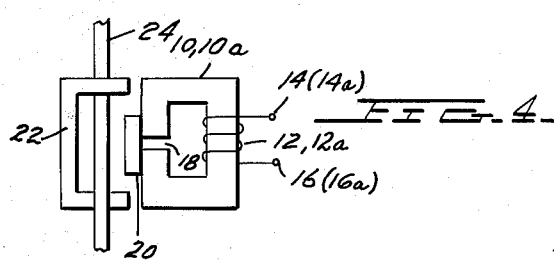
INVENTOR.
CHALLISS I. CLAUSING
BY
OSTROLENK, FABER, GERB & SOFFEN
ATTORNEYS Nov. 2, 1965
C. I. CLAUSING
3,215,799
MAGNETIC TRIP STRUCTURE FOR HIGH SPEED CIRCUIT BREAKERS
Filed May 2, 1961
2 Sheets-Sheet 2
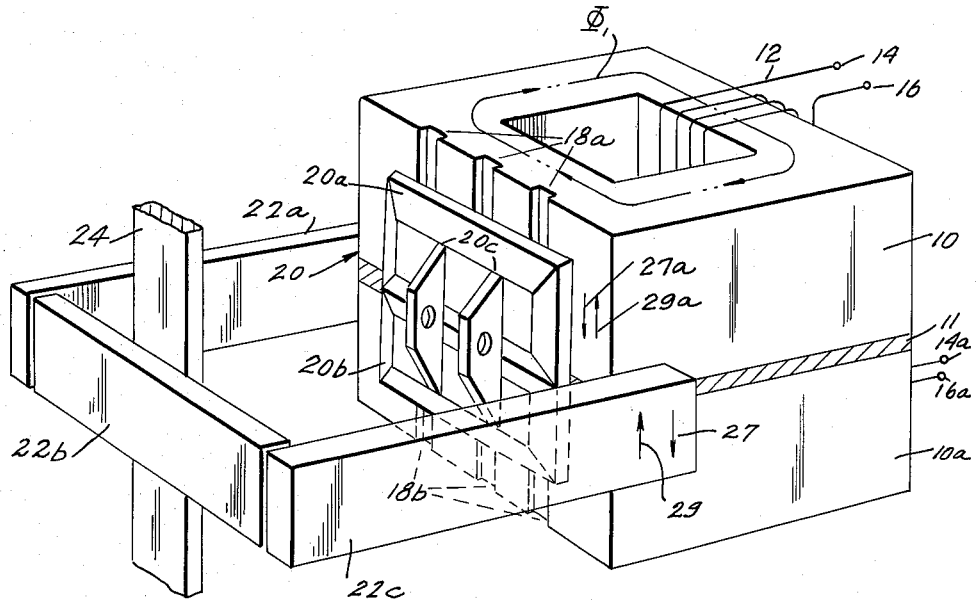
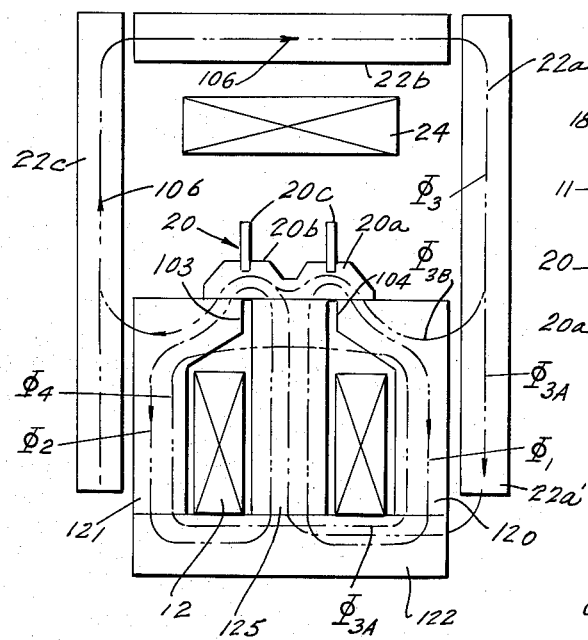
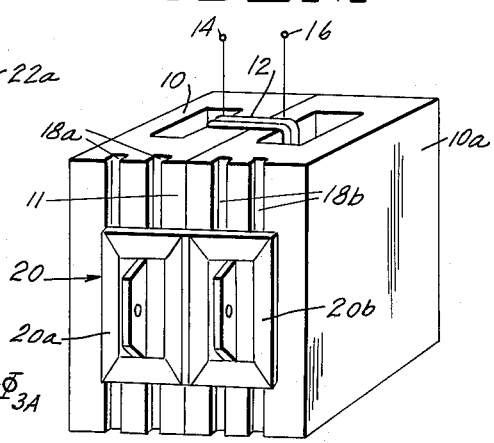
INVENTOR.
CHALLISS I. CLAUSING
BY
OSTROLENK, FABER, GERB & SOFFEN
ATTORNEYS

United States Patent Office 3,215,799
Patented Nov. 2, 1965

3,215,799
MAGNETIC TRIP STRUCTURE FOR HIGH
SPEED CIRCUIT BREAKERS
Challiss I. Clausing, Westmont, Collingswood, N.J., assignor to I-T-E Circuit Breaker Company, Philadelphia, Pa., a corporation of Pennsylvania
Filed May 2, 1961, Ser. No. 107,226
17 Claims. (Cl. 200—102)

My invention relates to high speed magnetic trip means and more particularly to magnetic trip means responsive to fault currents regardless of the direction of current flow.

High speed current limiting circuit breakers for D.C. systems are well known in the art. One such circuit breaker is set forth in the application Serial No. 660,982, filed May 22, 1957, now Patent No. 2,939,930, issued June 7, 1960, by C. I. Clausing and F. J. Pokorny, entitled "Motor Closing Mechanism for Circuit Breakers" and assigned to the assignee of the instant invention. Circuit breakers of this type employ a magnetic latch wherein the circuit breaker contacts are strongly biased toward the disengaged position and are latched in the engaged position by a magnetic seal which may be defeated by excessive ampere turns of the circuit being protected, which ampere turns are inductively coupled to the magnetic latch. Because of the nature of the magnetic latch this winding which is known as a bucking bar, will operate to defeat the magnetic seal when the current in the system being protected either rises or reverses direction but will not operate under both situations.

There are, however, many applications wherein high speed tripping is necessary under either of the above mentioned conditions. By way of example, in a rectifier installation, it is possible that the circuit being protected by the circuit breakers will have a fault causing it to attempt to conduct a reverse current with respect to a previously established D.C. current direction, whereby the circuit breaker is so arranged as to rapidly disconnect the circuit being protected under this reverse current type of fault. In the same system, however, and where several rectifiers each having their own respective high speed protective circuit breaker are connected in parallel, the failure of one or more of the parallel connected breakers will require the remaining rectifier units to supply the load current whereby the current through each of the remaining circuit breakers rises in a positive direction with an extremely rapid rate of rise of the current to satisfy the normal current requirements. These over currents in each branch are in some instances high enough to severely damage the remaining equipment making it necessary that the remaining rectifiers be disconnected from the line under a positive type of fault. When, however, the circuit breakers are equipped to have their magnetic latch operate only during the previously described fault condition where the current increases in a negative direction, auxiliary means are therefore required to make the latch structure responsive to positive type faults as well.

Arrangements of this type are set forth in copending applications Serial No. 804,744, filed April 7, 1959, now Patent No. 2,986,618, issued May 30, 1961, entitled "Time Delay Tripping Feature for High Speed Breakers" and Serial No. 851,736, filed November 9, 1959, now Patent No. 3,048,679, issued August 7, 1962, entitled "Trip System for High Speed Circuit Breakers" and Serial No. 26,854, filed May 4, 1960, entitled "Two Pole High Speed Breaker," and now abandoned. All of these being assigned to the assignee of the instant invention.

The first two aforementioned applications employ an auxiliary coil which enables the breaker to perform an instantaneous reverse current and a delayed forward over-current protection operation. The latter application employs a two pole breaker having two oppositely polarized latches. Although these solutions which require the addition of auxiliary coils and trip elements have solved the problems referred to above, the speed of the tripping operation in the direction opposite to the preferred direction determined by the bucking bar has not been as fast as the preferred direction.

The instant invention employs a novel magnetic circuit which permits the instantaneous tripping of the circuit breaker for fault currents regardless of the direction of current flow without the need for auxiliary coils or auxiliary tripped elements.

The magnetic member of the latch arrangement is divided into two sections. The magnetic member is provided with at least one polarizing coil which generates first and second magnetic flux patterns. The bucking bar generates a third magnetic flux path which opposes one of the flux paths generated by the polarizing coil and which aids the flux path generated by the remaining polarizing coil. The armature is positioned adjacent the flux paths generated by each polarizing coil. Although the bucking bar generates a magnetic flux which opposes one and aids the other flux path, the resultant flux paths are each of sufficient magnitude to seal the armature to the magnetic member under normal magnitude current conditions. During fault current conditions the third flux path generated by the bucking bar diminishes the magnitude of either the first or second flux path considerably, while increasing the remaining flux path only a very small amount, thereby substantially diminishing the overall sealing force exerted by the magnetic member upon the armature sufficiently to disengage the armature from the magnetic member under control of the powerful opening spring. By modifying the physical positioning of the armature and/or the bucking bar flux path with respect to the magnetic member and by modifying the current magnitude of the polarizing coils the magnetic latch may be made responsive to operate instantaneously to high magnitude positive current faults and low magnitude negative current faults or high magnitude positive and negative current faults or any other combination thereof.

If desired, the polarities of the polarizing coils may be so arranged as to enable the duo-directional magnetic latch to be employed as a uni-directional magnetic latch for use in systems requiring circuit breakers of this nature. The modification needed is so slight that the circuit breaker may be manufactured in one uniform manner and the modification may be made at any time thereafter.

It is therefore one object of my invention to provide a novel magnetic latch for a circuit breaker which is arranged to provide instantaneous tripping, in response to either positive or negative fault current conditions.

Another object of my invention is to provide a novel magnetic latch for a circuit breaker wherein the bucking bar controls the opening of the magnetic latch for both positive and negative fault current conditions.

Still another object of my invention is to provide a novel duo-directional magnetic latch for a circuit breaker which is so arranged as to provide instantaneous tripping for positive and negative current faults of any predetermined current magnitude.

A further object of my invention is to provide a duo-directional magnetic latch for a circuit breaker which is so arranged as to permit the response to positive fault current conditions to occur at a current magnitude which is completely independent of the current magnitude at which the negative fault current tripping operation occurs.

Still another object of my invention is to provide a duo-directional magnetic latch for high speed circuit breakers having opposing magnetic flux paths which interact with the bucking bar flux path to produce instantaneous tripping of the circuit breaker regardless of the fault current direction.

These and other objects of my invention will become apparent from the following description when taken in connection with the drawings, in which:

FIGURES 1, 2 and 3 are side plan views of the magnetic latch structure in combination with a circuit breaker showing the circuit breaker in the closed, tripped and reset positions, respectively.

FIGURE 4 is a schematic diagram showing the top view of the magnetic latch shown in FIGURES 1 through 3.

FIGURE 5 is a perspective view of my novel magnetic latch.

FIGURE 6 is a top view of the magnetic latch set forth in FIGURE 5 showing the flux paths generated by the respective coils.

FIGURE 7 is a perspective view showing another preferred embodiment of my novel magnetic latch.

FIGURE 8 is a top view of the magnetic latch shown in FIGURE 7 which includes the flux paths generated by the associated coils.

Referring now to the drawings, circuit breaker 100 of FIGURE 1 is shown as being of the type described in detail in my aforesaid co-pending application, Serial No. 660,982 now Patent No. 2,939,930, issued June 7, 1960. In FIGURE 1, high speed circuit breaker 100 is in its closed position with movable contact 28 being in engagement with stationary contact 26. Spring 34 exerts a direct acting opening force upon movable contact 28 through a current carrying movable arm 24 (which acts as a bucking bar) but breaker 100 is held closed by the magnetic latch comprising armature 20 which is secured to magnetic members or cores 10 and 10a by magnetic flux generated by polarizing coils or windings 12 and 12a respectively.

The magnetic structure comprised of members 10 and 10a which is otherwise free to pivot about point 42, is maintained in the position of FIGURE 1 by an over-center toggle comprising links 46 and 48 whose knee 49 bears against stop 54. The toggle condition illustrated in FIGURE 1 is maintained by the clockwise component of force produced by the opening spring 34 and transmitted through armature 20 which is sealed to magnetic structures 10 and 10a in a manner to be more fully described.

Circuit breaker 100 in response to an over current condition operates in the following manner: Upon the occurrence of a fault current of either positive or negative direction, magnetic structures 10 and 10a are operated upon by bucking bar 24 (see FIGURE 4) creating a decreasing flux density therein in a manner to be more fully described, causing armature 20 to be released from its sealed position with regard to magnetic members 10 and 10a. At this instant, opening spring 34 assumes control of the circuit breaker 100 causing walking beam 38 to rotate clockwise about pivot 42 and movable arm (or bucking bar) 24 to rotate clockwise about pivot 32 thereby moving contact 28 rapidly out of engagement with cooperating contact 26. At this instant, the clockwise component of force produced by opening spring 34 is no longer transmitted through armature 20 to toggle members 46 and 48, enabling spring 52 to urge toggle links 48 and 46 to move towards the collapsed position shown in FIGURE 3. Armature 20 is then enabled to return to its sealed position with magnetic members 10 and 10a.

Contact closing is then accomplished by operating motor 50 which drives link 48 clockwise through a slip clutch (not shown) until the over center toggle condition of FIGURE 1 is reestablished. When knee 49 engages stop 54, the slip clutch disengages motor 50 and the motor control circuit is opened by limit switch contacts (not shown) which are operated by toggle members 46 and 48. During this closing operation, armature 20 is sealed to magnetic members 10 and 10a by the polarizing coils 12 and 12a respectively. If adverse conditions still exist in the main circuit, high speed circuit breaker 100 is free to trip under control of the magnetic latch even though motor 50 is driving the magnetic structures 10 and 10a counter clockwise towards the closed position.

The novel magnetic latch may best be seen in FIGURES 5 and 6 and is comprised of rectangularly shaped magnetic cores 10 and 10a separated from one another by a non-magnetic spacer 11. Each core has a polarizing coil 12 and 12a respectively for generating magnetic flux through its associated core. The magnetic core 22 is comprised of legs 22a, 22b and 22c. Legs 22a and 22c are adjustably supported from the circuit breaker support means 17 and 19 (see FIGURE 6) by pairs of screws 21 and 23 respectively whereby the dimensions of the air gaps between the legs 22a and 22c with respect to magnetic structures 10 and 10a and leg 22b is controlled.

The bucking bar 24 which is connected in serial relation with the circuit being protected will generate a magnetic flux in magnetic core 22 which will interact with the flux paths generated by each of the magnetic members 10 and 10a in a manner to be more fully described.

As can best be seen in FIGURE 4, magnetic structure 10 has a polarizing coil 12 thereon which is energized from a D.C. energizing source which is connected to terminals 14 and 16. The magnetic structure 10 includes an air gap 18 of relatively high reluctance. This air gap acts to divert the magnetic flux in magnetic member 10 through armature 20. Magnetic member 10a having coil 12a and gaps 18b is identical in both function and design to magnetic member 10.

The magnetic cores 10 and 10a of FIGURES 1–3 and 5 are similar in design to the magnetic member 10c of FIGURE 4, however, the high reluctance paths are obtained by means of slots 18a and 18b respectively.

Referring especially to FIGURE 6, polarizing coil 12 is so arranged with its D.C. energizing force to generate a flux path $\Phi_1$ in magnetic member 10 having a clockwise flux direction. Magnetic coil 12a is so arranged with its D.C. energizing source as to generate a magnetic flux path $\Phi_2$ which has a counterclockwise magnetic flux direction. Although it appears from FIGURE 6 that both flux paths $\Phi_1$ and $\Phi_2$ lie in the same plane, it can clearly be seen from FIGURE 5 that magnetic cores 10 and 10a are separated by a non-magnetic insulating member 11 so that flux paths $\Phi_1$ and $\Phi_2$ not only lie in different planes but are also prevented from interacting with one another by the non-magnetic spacing means 11.

Bucking bar 24 generates a magnetic flux $\Phi_3$ through the legs 22a, 22b and 22c of magnetic core 22 which magnetic path is completed by magnetic cores 10 and 10a which shunt legs 22a and 22c to form a closed continuous magnetic path. It can be seen from FIGURE 5 that legs 22a and 22c are adjacent portions of both magnetic core 10 and magnetic core 10a so that the magnetic flux $\Phi_3$ will be divided relatively equally between the magnetic cores 10 and 10a.

Assuming that current in the positive going direction through bucking bar 24 generates magnetic flux $\Phi_3$ (see FIGURE 6) in the counter clockwise direction as shown by arrow 23a, the magnetic flux $\Phi_3$ will act to aid the magnetic flux $\Phi_1$ which exists in magnetic core 10 and will act to oppose the magnetic flux $\Phi_2$ which exists in core 10a. Magnetic cores 10 and 10a are formed of a saturable ferro-magnetic material so that the magnetic flux $\Phi_1$ and flux $\Phi_2$ generated by magnetic cores 10 and 10a respectively are substantially near the saturation point. Thus the resultant magnetic flux in magnetic core 10 which is composed of $\Phi_1+\Phi_3$ will be almost equal to $\Phi_1$ since magnetic core 10 is very close to the magnetic saturation point.

The magnetic flux $\Phi_3$ which opposes the magnetic flux $\Phi_2$ in magnetic core 10a will diminish the resultant magnetic flux in core 10a, but is of insufficient magnitude during normal current conditions as to sufficiently reduce the magnetic flux in core 10a to cause circuit breaker tripping.

Upon the occurrence of a fault current condition in the positive direction as shown by arrow 23b in FIGURE 6 the magnetic flux in core 10 which is comprised of $\Phi_1+\Phi_3$ remains relatively equal to $\Phi_3$ alone due to the near saturation condition in magnetic core 10. However, due to the opposing relations between magnetic fluxes $\Phi_3$ and $\Phi_2$ in core 10a, portion 20b of armature 20 experiences a relatively small magnitude sealing flux which is provided by magnetic core 10a for portion 20b of armature 20. The sealing force provided by magnetic core 10 for the upper portion 20a of armature 20 has not increased appreciably over the magnitude of the sealing force during normal current operation so that the resultant sealing force on armature 20 has diminished considerably. In this condition, opening spring 34 (see FIGURES 1 through 3) assumes control of circuit breaker 100 causing armature 20 to be disengaged from magnetic members 10 and 10a which results in simultaneous disengagement of cooperating contacts 26 and 28.

The operation of the magnetic latch in FIGURE 5 is substantially the same for negative going fault current which generates a flux having a direction shown by arrow 23a in FIGURE 6. The only difference between the operation for negative going fault current is that the magnetic flux $\Phi_3$ will aid the flux $\Phi_2$ in core 10a and will oppose the flux $\Phi_1$ in core 10. However, the final result is the same, namely that the force of opening spring 34 overcomes the sealing forces exerted by cores 10 and 10a causing instantaneous opening of cooperating contacts 26 and 28.

If it is desired to have instantaneous tripping upon the occurrence of positive going fault current of a certain magnitude and instantaneous tripping of negative going current of a magnitude substantially more or less than the magnitude of the positive going current, the polarizing coils 12 and 12a may be modified so that winding 12 has fewer windings than coil 12a or the energizing source for winding 12 is of a smaller magnitude than the D.C. energizing source of winding 12a. Another method of calibrating the response of the magnetic latch is by positioning legs 22a and 22c up or down as shown by arrows 29 and 27 respectively so that more or less magnetic flux from magnetic core 22 will pass through magnetic core 10 than will pass through magnetic core 10a. Still another method of regulating the response of the magnetic latch is by changing the vertical positioning of armature 20 in the directions shown by arrows 27a and 29a so that magnetic core 10 will exert a lesser or greater sealing force respectively upon armature 20. Naturally, all three of the above methods may be employed simultaneously to produce a variety of positive and negative going fault current ratios depending strictly upon the requirements of the individual circuit to be protected.

FIGURE 7 sets forth another magnetic latch arrangement in which magnetic cores 10 and 10a are arranged so that their longitudinal axes are substantially parallel. Only one polarizing coil 12 is provided for magnetic cores 10 and 10a for a purpose to be more fully described. Air gaps 18a and 18b located on magnetic cores 10 and 10a respectively serve to divert the magnetic flux from cores 10 and 10a to portions 20a and 20b respectively of armature 20 in the same manner as described above with respect to the embodiment of FIGURE 5.

FIGURE 8 differs slightly from FIGURE 7 in that air gaps 103, 104 are provided in place of air graps 18a and 18b shown in FIGURE 7. Also, as an alternative to forming the core structure of magnetic cores 10 and 10a as shown in FIGURE 7, the magnetic core structure is comprised of bars 120, 121, 122, and 125.

The operation of the magnetic latch shown in FIGURE 7 can best be understood by reference to FIGURE 8. The polarizing coil 12 is so arranged with a D.C. energizing source as to generate the magnetic flux paths $\Phi_1$ and $\Phi_2$ having clockwise and counterclockwise flux directions respectively. The path taken by flux lines $\Phi_1$ consists of bar 122, bar 125, portion 20a or armature 20 and bar 120. The air gap 104 is provided to divert the flux $\Phi_1$ to the lower reluctance path of portion 20a of armature 20.

Flux lines $\Phi_2$ take a line path through bars 121, 122, 125 and portion 20b of armature 20, air gap 103 serving the same function as air gap 104 described above.

The current through bucking bar 24 creates a magnetic flux path $\Phi_3$ having a direction shown by arrows 106 which path consists of bars 22a, magnetic core structure 120, 121, 122, and 125, bar 22c and bar 22b.

The flux lines $\Phi_3$ entering the magnetic structure divides into branches $\Phi_{3a}$ and $\Phi_{3b}$. Branch $\Phi_{3a}$ extends from the lower end 22a' of bar 22a, the right hand half of bar 122 to bar 125, portion 20b of armature 20, and the upper end of bar 121 to bar 22c. It can be seen that the flux lines $\Phi_{3a}$ in bars 122, 125 and portion 20b of armature 20 have a direction which aids the magnetic flux $\Phi_2$ which flux is in a state of near saturation. The resultant flux which is comprised of flux $\Phi_{3a} + \Phi_2$ through portion 20b of armature 20 nevertheless remains substantially the same magnitude as flux $\Phi_2$ due to the saturation condition as described above.

Branch $\Phi_{3b}$ of magnetic flux lines $\Phi_3$ enters magnetic bar 120 in a direction opposing the direction of flux lines $\Phi_1$ in bar 120. Due to this high reluctance condition confronting branch $\Phi_{3b}$ substantially all of the flux will take the path of flux lines $\Phi_{3a}$ which is a lower reluctance path.

However, during a fault current condition wherein the current direction is the same as the direction of current which generated the magnetic flux $\Phi_3$, the magnitude of flux $\Phi_3$ increases considerably to the point where branch $\Phi_{3b}$ diminishes the resultant flux $(\Phi_1-\Phi_{3b})$ through portion 20a of armature 20 considerably. As has been set forth above, the resultant flux $(\Phi_{3a}+\Phi_2)$ in portion 20b of armature 20 remains substantially equal to the magnitude of the flux $\Phi_2$ alone so that the resultant flux in armature 20 diminshes considerably enabling the opening spring 34 (see FIGURES 1 through 3) to rapidly unseal armature 20 from the magnetic structure and to simultaneously cause the disengagement of cooperating contacts 26 and 28.

In the case of fault currents having a current direction opposite to the current direction shown in FIGURE 8 the operation of a magnetic latch of FIGURE 1 is the same as described above except that the flux lines $\Phi_3$, $\Phi_{3a}$ and $\Phi_{3b}$ become a mirror image of those shown in FIGURE 8 resulting in diminished flux appearing in the portion 20b of armature 20 which is just the reverse of the condition described above with respect to fault current of the positive going direction as shown by arrows 106.

It will be noted that although FIGURE 7 shows the magnetic structure as comprised of two completely closed magnetic cores 10 and 10a and FIGURE 8 shows the magnetic equivalent of cores 10 and 10a by the use of bars 120, 121, 122 and 125, it should be noted that the response and operation of the circuit will be just as favorable in the arrangement of FIGURE 7 as it will in the arrangement of FIGURE 8. It should also be noted that air gaps 103 and 104 are the equivalent of gaps or slots 18a and 18b shown in FIGURE 7.

As in the case of the embodiment shown in FIGURE 5, various modifications may be perfected in the embodiments of FIGURES 7 and 8 in order to regulate the response of a magnetic latch to fault current conditions wherein it is possible to control tripping of positive and negative going currents at predetermined magnitudes that are separate and distinct from one another. For example, the widths of air gaps 103 and 104 may be increased or diminished with respect to one another to form reluctance paths which differ substantially from one another. Another possible modification is to provide magnetic cores 10a and 10b with separate coils thereby making it possible to introduce different current magnitudes into each individual coil so that the magnitude of flux lines $\Phi_1$ and $\Phi_2$ may be made substantially different from one another.

Referring now to FIGURE 5, it should be understood that a magnetic latch shown in this figure may be utilized to be responsive to fault currents of only one direction simply by arranging the polarities of polarizing coils 12 and 12a so that the direction of flux lines $\Phi_1$ and $\Phi_2$ are both clockwise (or counterclockwise).

Assuming that the polarizing coils 12 and 12a are energized so that flux lines $\Phi_1$ and $\Phi_2$ have clockwise magnetic directions then the magnetic latch will trip in response to fault current which generates magnetic flux lines $\Phi_3$ having the clockwise direction shown by arrow 23a whereas fault current generating flux lines $\Phi_3$ having the counter-clockwise direction shown by arrow 23b is totally ineffective to trip the magnetic latch. In this arrangement it can be seen that the magnetic latch of FIGURE 6 may be manufactured without regard for its ultimate use since the one step needed to change the magnetic latch from a uni-directional responsive device to a duo-directional responsive device is the connections of the terminals 14, 16 and 14a, 16a to the D.C. energizing source which connections need not be made until the equipment is actually installed.

This is likewise true of the magnetic latch arrangement shown in FIGURES 7 and 8 which may be modified to become a uni-directional tripping device by replacing polarizing coil 12 by separate polarizing for each flux loop $\Phi_1$ and $\Phi_3$ and energizing the separate coils so that the resultant flux pattern which occurs is shown by the flux lines $\Phi_4$.

In the foregoing I have described my invention only in connection with the preferred embodiments thereof. Many variations and modifications of the principles of my invention within the scope of the description herein are obvious to those skilled in the art. Accordingly I prefer to be bound not by the specific disclosure herein but only by the appending claims.

I claim:

1. A magnetic latch for selectively holding and instantaneously releasing an armature upon the occurrence of a fault current of either forward or reverse current direction comprising a magnetic member having first and second independent magnetic circuits, polarizing means for generating first and second paths of magnetic flux in said first and second magnetic circuits, the flux density of said flux paths being sufficient to seal said armature to said magnetic member, second means for generating a third flux path in said magentic member in response to the fault current flowing therethrough, said third flux path being adapted to oppose said second flux path in response to the fault current of said forward direction and to oppose said first flux path in response to fault current of said reverse direction.

2. A magnetic latch for selectively holding and instantaneously releasing an armature upon the occurrence of a fault current of either forward or reverse current direction comprising a magnetic member having first and second independent magnetic circuits, polarizing means for generating first and second paths of magnetic flux in said first and second magnetic circuits, the flux density of said flux paths being sufficient to seal said armature to said magnetic member, second means for generating a third flux path in said magentic member in response to the fault current flowing therethrough, said third flux path being adapted to oppose said second flux path in response to the fault current of said forward direction and to oppose said first flux path in response to fault current of said reverse direction, said second means comprising a magnetic core having a conductor threaded therethrough for generating said third magnetic flux path.

3. A magnetic latch for selectively holding and instantaneously releasing an armature upon the occurrence of a fault current of either forward or reverse current direction comprising a magnetic member having first and second independent magnetic circuits, polarizing means for generating first and second paths of magnetic flux in said first and second magnetic circuits, the flux density of said flux paths being sufficient to seal said armature to said magnetic member, second means for generating a third flux path in said magentic member in response to the fault current flowing therethrough, said third flux path being adapted to oppose said second flux path in response to the fault current of said forward direction and to oppose said first flux path in response to fault current of said reverse direction, said second means comprising a magnetic core having a conductor threaded therethrough for generating said third magnetic flux path, said magnetic core having a first air gap, said magnetic member being positioned adjacent said air gap to form a path across said air gap having a smaller reluctance than said air gap.

4. A magnetic latch for selectively holding and instantaneously releasing an armature upon the occurrence of a fault current of either forward or reverse current direction comprising a magnetic member, polarizing means for generating first and second paths of magnetic flux in said magnetic member, the flux density of said flux paths being sufficient to seal said armature to said magnetic member, second means for generating a third flux path in said magnetic member in response to the fault current flowing therethrough, said third flux path being adapted to oppose said second flux path in response to fault current of said forward direction and to oppose said first flux path in response to fault current of said reverse direction, said second means comprising a magnetic core having a conductor threaded therethrough for generating said third magnetic flux path, said magnetic core having an air gap, said magnetic member being positioned adjacent said air gap to form a path across said air gap having a smaller reluctance than said air gap, said magnetic member comprising a second and third magnetic core, a portion of said first and second magnetic cores being positioned within said air gap.

5. A magnetic latch for selectively holding and instantaneously releasing an armature upon the occurrence of a fault current of either forward or reverse current direction comprising a magnetic member, polarizing means for generating first and second paths of magnetic flux in said magnetic member, the flux density of said flux paths being sufficient to seal said armature to said magnetic member, second means for generating a third flux path in said magnetic member in response to the fault current flowing therethrough, said third flux path being adapted to oppose said second flux path in response to fault current of said forward direction and to oppose said first flux path in response to fault current of said reverse direction, said second means comprising a magnetic core having a conductor threaded therethrough for generating said third magnetic flux path, said magnetic core having an air gap, said magnetic member being positioned adjacent said air gap to form a path across said air gap having a smaller reluctance than said air gap, said magnetic member comprising a second and third magnetic core, a portion of said first and second magnetic cores being positioned within said air gap, at least one polarizing winding inductively coupled to one of said cores.

6. A magnetic latch for selectively holding and instantaneously releasing an armature upon the occurrence of a fault current of either forward or reverse current direction comprising a magnetic member, polarizing means for generating first and second paths of magnetic flux in said magnetic member, the flux density of said flux paths being sufficient to seal said armature to said magnetic member, second means for generating a third flux path in said magnetic member in response to the fault current flowing therethrough, said third flux path being adapted to oppose said second flux path in response to fault current of said forward direction and to oppose said first flux path in response to fault current of said reverse direction, said second means comprising a magnetic core having a conductor threaded therethrough for generating said third magnetic flux path, said magnetic core having a first air gap, said magnetic member being positioned adjacent said air gap to form a path across said air gap having a smaller reluctance than said air gap, said magnetic member comprising a second and third magnetic core, a portion of said first and second magnetic cores being positioned within said first air gap, each of said second and third magnetic cores having an air gap for diverting the magnetic flux existing therein through said armature.

7. A magnetic latch for selectively holding and instantaneously releasing an armature upon the occurrence of a fault current of either forward or reverse current direction comprising a magnetic member having first and second independent magnetic circuits, polarizing means for generating first and second paths of magnetic flux in said first and second magnetic circuits, the flux density of said flux paths being sufficient to seal said armature to said magnetic member, second means for generating a third flux path in said magnetic member in response to the fault current flowing therethrough, said third flux path being adapted to oppose said second flux path in response to the fault current of said forward direction and to oppose said first flux path in response to fault current of said reverse direction, the first and second circuits of said magnetic member respectively having first and second apertures, substantially parallel to and adjacent one another, a polarizing winding threaded through said first and second apertures respectively, for generating first and second magnetic flux paths.

8. A magnetic latch for selectively holding and instantaneously releasing an armature upon the occurrence of a fault current of either forward or reverse current direction comprising a magnetic member, polarizing means for generating first and second paths of magnetic flux in said magnetic member, the flux density of said flux paths being sufficient to seal said armature to said magnetic member, second means for generating a third flux path in said magnetic member in response to the fault current flowing therethrough, said third flux path being adapted to oppose said second flux path in response to the fault current of said forward direction and to oppose said first flux path in response to fault current of said reverse direction, said magnetic member comprising first and second magnetic cores each having an aperture, said apertures being in axial alignment, insulating means having an aperture positioned between said cores, the aperture of said insulating means being in axial alignment with said core apertures, first and second polarizing windings inductively coupled to said first and second magnetic cores, respectively.

9. A magnetic latch for selectively holding and instantaneously releasing an armature upon the occurrence of a fault current of either forward or reverse current direction comprising a magnetic member, polarizing means for generating first and second paths of magnetic flux in said magnetic member, the flux density of said flux paths being sufficient to seal said armature to said magnetic member, second means for generating a third flux path in said magnetic member in response to the fault current flowing therethrough, said third flux path being adapted to oppose said second flux path in response to the fault current of said forward direction and to oppose said first flux path in response to fault current of said reverse direction, said magnetic member comprising first and second magnetic cores each having an aperture, said apertures being in axial alignment, insulating means having an aperture positioned between said cores, the aperture of said insulating means being in axial alignment with said core apertures, first and second polarizing windings inductively coupled to said first and second magnetic cores, respectively, said second means comprising a third magnetic core having a conductor threaded therethrough, said magnetic core having an air gap, said first and second magnetic cores being positioned adjacent said air gap.

10. A magnetic latch for selectively holding and instantaneously releasing an armature upon the occurrence of a fault current of either forward or reverse current direction comprising a magnetic member, polarizing means for generating first and second paths of magnetic flux in said magnetic member, the flux density of said flux paths being sufficient to seal said armature to said magnetic member, second means for generating a third flux path in said magnetic member in response to the fault current flowing therethrough, said third flux path being adapted to oppose said second flux path in response to the fault current of said forward direction and to oppose said first flux path in response to fault current of said reverse direction, said magnetic member having first and second apertures, substantially parallel to and adjacent one another, a polarizing winding threaded through said first and second apertures respectively, for generating first and second magnetic flux paths, said second means comprising a third magnetic core having a conductor threaded therethrough, said magnetic core having an air gap, said first and second magnetic cores being positioned adjacent said air gap.

11. A magnetic latch for selectively holding and instantaneously releasing an armature upon the occurrence of a fault current of either forward or reverse current direction comprising a magnetic member, polarizing means for generating first and second paths of magnetic flux in said magnetic member, the flux density of said flux paths being sufficient to seal said armature to said magnetic member, second means for generating a third flux path in said magnetic member of response to the fault current flowing therethrough, said third flux path being adapted to oppose said second flux path in response to the fault current of said forward direction and to oppose said first flux path in response to fault current of said reverse direction, said magnetic member comprising first and second magnetic cores each having an aperture, said apertures being in axial alignment, insulating means having an aperture positioned between said cores, the aperture of said insulating means being in axial alignment with said core apertures, first and second polarizing windings inductively coupled to said first and second magnetic cores, respectively, said second means comprising a third magnetic core having a conductor threaded therethrough, said magnetic core having an air gap, said first and second magnetic cores being positioned adjacent said air gap, said first and second magnetic cores each having an air gap for diverting the magnetic flux generated in said cores through said armature.

12. A magnetic latch for selectively holding and instantaneously releasing an armature upon the occurrence of a fault current of either forward or reverse current direction comprising a magnetic member, polarizing means for generating first and second paths of magnetic flux in said magnetic member, the flux density of said flux paths being sufficient to seal said armature to said magnetic member, second means for generating a third flux path in said magnetic member in response to the fault current flowing therethrough, said third flux path being adapted to oppose said second flux path in response to the fault current of said forward direction and to oppose said first flux path in response to fault current of said reverse direction, said magnetic member having first and second apertures, substantially parallel to and adjacent one another, a polarizing winding threaded through said first and second apertures respectively, for generating first and second magnetic flux paths, said second means comprising a third magnetic core having a conductor threaded therethrough, said magnetic core having an air gap, said first and second magnetic cores being positioned adjacent said air gap, said first and second magnetic cores each having an air gap for diverting the magnetic flux generated in said cores through said armature.

13. A circuit breaker having a high speed trip means responsive to fault currents of both forward and reverse current directions comprising a pair of cooperating contacts movable between an engaged and a disengaged position, first means operatively connected to said cooperating contacts normally biased to urge said cooperating contacts towards said disengaged position, a magnetic latch having an armature operatively connected to said cooperating contacts, a magnetic member, having first and second independent magnetic circuits said armature being movable into and out of magnetically sealed relationship with respect to said magnetic member, polarizing means inductively coupled to said magnetic member for generating first and second magnetic flux paths in said first and second magnetic circuits, a second magnetic member having a conductor threaded therethrough for generating a third magnetic flux path, said first magnetic member being positioned in the magnetic circuit of said second magnetic member, said third magnetic flux path generated by said conductor being adapted to oppose said first magnetic flux path upon the occurrence of a fault current in said forward direction and to oppose said second magnetic flux path upon the occurrence of a fault current in said reverse current direction.

14. A circuit breaker having a high speed trip means responsive to fault currents of both forward and reverse current directions comprising a pair of cooperating contacts movable between an engaged and a disengaged position, first means operatively connected to said cooperating contacts normally biased to urge said cooperating contacts towards said disengaged position, a magnetic latch having an armature operatively connected to said cooperating contacts, a magnetic member, said armature being movable into and out of magnetically sealed relationship with respect to said magnetic member, polarizing means inductively coupled to said magnetic member for generating first and second magnetic flux paths in said magnetic member, a second magnetic member having a conductor threaded therethrough for generating a third magnetic flux path, said first magnetic member being positioned in the magnetic circuit of said second magnetic member, said third magnetic flux path generated by said conductor being adapted to oppose said first magnetic flux path upon the occurrence of a fault current in said forward direction and to oppose said second magnetic flux path upon the occurrence of a fault current in said reverse current direction, said first magnetic member including a magnetic core having first and second apertures, a polarizing winding threaded through said apertures, each of said apertures having an air gap for generating said first and second magnetic flux paths surrounding respectively said first and second apertures, first and second air gaps adjacent said first and second apertures, respectively, for diverting said first and second magnetic flux paths respectively through said armature.

15. A circuit breaker having a high speed trip means responsive to fault currents of both forward and reverse current directions comprising a pair of cooperating contacts movable between an engaged and a disengaged position, first means operatively connected to said cooperating contacts normally biased to urge said cooperating contacts towards said disengaged position, a magnetic latch having an armature operatively connected to said cooperating contacts, a magnetic member, said armature being movable into and out of magnetically sealed relationship with respect to said magnetic member, polarizing means inductively coupled to said magnetic member for generating first and second magnetic flux paths in said magnetic member, a second magnetic member having a conductor threaded therethrough for generating a third magnetic flux path, said first magnetic member being positioned in the magnetic circuit of said second magnetic member, said third magnetic flux path generated by said conductor being adapted to oppose said first magnetic flux path upon the occurrence of a fault current in said forward direction and to oppose said second magnetic flux path upon the occurrence of a fault current in said reverse current direction, said first magnetic member including first and second magnetic cores each having an aperture, said apertures being in axial alignment, first and second polarizing means inductively coupled to said first and second cores respectively for generating said first and second magnetic flux paths, each of said cores having an air gap for diverting said first and second magnetic flux paths, respectively, through said armature.

16. A magnetic latch for selectively sealing and releasing an armature comprising first and second magnetic members positioned adjacent one another and adapted to form first and second magnetic circuits each of said members having an aperture, the axes of said apertures being substantially parallel to one another; a third magnetic member having a first air gap, said first and second magnetic members being positioned substantially within said first air gap, a bucking bar threading said third magnetic member for generating a first magnetic flux in said third magnetic member and through said air gap, polarizing means or generating second and third magnetic fluxes in said first and second magnetic circuits respectively; said first magnetic flux being aided by said second flux and being opposed by said third flux; said armature being movable into and out of sealing engagement with said first and second magnetic members.

17. A magnetic latch for selectively sealing and releasing an armature comprising first and second magnetic members positioned adjacent one another and adapted to form first and second magnetic circuits, each of said members having an aperture, the axis of said apertures being substantially parallel to one another; a third magnetic member having a first air gap, said first and second magnetic members being positioned substantially within said first air gap, a bucking bar threading said third magnetic member for generating a first magnetic flux in said third magnetic member and through said air gap, polarizing means for generating second and third magnetic fluxes in said first and second magnetic circuits respectively; said first magnetic flux being aided by said first and second fluxes; said armature being movable into and out of sealing engagement with said first and second magnetic members.

References Cited by the Examiner

UNITED STATES PATENTS

| | | | |
|---|---|---|---|
| 1,042,183 | 10/12 | Woodbridge | 200—93 |
| 2,289,182 | 7/42 | Dickinson | 200—106 |
| 2,850,596 | 9/58 | Clausing | 200—106 |
| 2,881,283 | 4/59 | Clausing | 200—93 |
| 2,881,287 | 4/59 | Clausing | 200—106 |
| 2,986,618 | 5/61 | Clausing | 200—93 |
| 2,992,308 | 7/61 | Fehling | 200—102 |

FOREIGN PATENTS

| | | |
|---|---|---|
| 424,671 | | Germany. |
| 132,138 | 3/29 | Switzerland. |

BERNARD A. GILHEANY, *Primary Examiner.*

MAX L. LEVY, *Examiner.*